US010583813B2

(12) United States Patent
Jarnagin

(10) Patent No.: US 10,583,813 B2
(45) Date of Patent: Mar. 10, 2020

(54) WHEEL RIM CLEANER

(71) Applicant: Bruce Jarnagin, Newark, DE (US)

(72) Inventor: Bruce Jarnagin, Newark, DE (US)

(*) Notice: Subject to any disclaimer, the term of this patent is extended or adjusted under 35 U.S.C. 154(b) by 0 days.

(21) Appl. No.: 15/915,647

(22) Filed: Mar. 8, 2018

(65) Prior Publication Data
US 2018/0257609 A1    Sep. 13, 2018

Related U.S. Application Data

(60) Provisional application No. 62/468,973, filed on Mar. 9, 2017.

(51) Int. Cl.
B60S 1/68 (2006.01)

(52) U.S. Cl.
CPC ..................... B60S 1/68 (2013.01)

(58) Field of Classification Search
CPC ...... B60S 1/68; B60S 1/00; B60S 1/66; B60S 3/042; B60S 3/04; B60S 3/00; B60S 3/045; B60B 7/00; B60B 7/02; B60B 7/06; B60B 7/04; B60B 7/066; B60B 7/20; A46B 2200/3046
See application file for complete search history.

(56) References Cited

U.S. PATENT DOCUMENTS

| 2,832,085 A * | 4/1958 | Chamberlain ..... B29D 30/0633 15/160 |
| 2,975,447 A * | 3/1961 | Vuchinas ................ B60S 3/042 15/53.4 |
| 4,551,952 A * | 11/1985 | West ....................... B24B 5/366 451/439 |
| 5,123,136 A | 6/1992 | Belanger et al. |
| 5,785,390 A * | 7/1998 | Gold ......................... B60B 7/00 301/108.1 |
| 6,295,681 B1 | 10/2001 | Dolah |
| 6,776,698 B2 * | 8/2004 | Pepin ........................ B60S 1/68 15/160 |
| 6,895,980 B2 * | 5/2005 | Rosborough ........... B05B 12/30 134/123 |
| 7,356,867 B1 | 4/2008 | Beiermann |
| 7,708,316 B2 * | 5/2010 | Sekii ....................... B60S 1/685 280/855 |
| 9,216,439 B2 | 12/2015 | Blanc |
| 9,242,335 B2 * | 1/2016 | Beck, Jr. ................. B24B 29/04 |
| 10,196,048 B2 * | 2/2019 | Yoon ...................... B60B 33/00 |
| 10,246,061 B2 * | 4/2019 | Voelker ................... B60S 3/045 |
| 10,343,450 B2 * | 7/2019 | Butler ....................... B60B 7/06 |
| 2007/0177931 A1 | 8/2007 | Hodges |

* cited by examiner

Primary Examiner — James M Dolak
(74) Attorney, Agent, or Firm — Boudwin Intellectual Property

(57) ABSTRACT

A wheel rim cleaner for cleaning a rim of tire. The wheel rim cleaner includes a housing having a first side and a second side. The first side includes a first fastener disposed at a center thereof. An elongated arm extends radially from the first fastener, wherein the elongated arm includes a brush member on a distal end thereof. The elongated arm is telescopic such that the arm extends outwardly and retracts inwardly relative to the center of the first side. The second side includes a sidewall extending from a perimeter thereof, wherein the sidewall defines an open end. A bearing is disposed within the open end, wherein the bearing rotates the housing independently from a hub of a wheel rim. A second fastener is affixed to the bearing, wherein the second fastener secures the wheel rim cleaner to the hub of the wheel rim.

11 Claims, 5 Drawing Sheets

WHEEL RIM CLEANER

CROSS REFERENCE TO RELATED APPLICATION

This application claims the benefit of U.S. Provisional Application No. 62/468,973 filed on Mar. 9, 2017. The above identified patent application is herein incorporated by reference in its entirety to provide continuity of disclosure.

BACKGROUND OF THE INVENTION

The present invention relates to wheel rim cleaning devices. More specifically, the present invention provides a wheel rim cleaner for removing dirt and grime from the surface of a wheel rim. When secured to the wheel rim, the housing and the brush of the wheel rim cleaner rotate independently from the rim, thereby cleaning the surface of the wheel rim while a vehicle is in motion.

It is a common occurrence for dirt and grime to accumulate on wheel rims of a vehicle during normal usage. In most instances, removing the accumulated dirt and grime is a time consuming and laborious task for the vehicle owner. Many vehicle owners prefer their rims to be clean and shiny on a regular basis, however maintaining this can be difficult. Currently, there is no way to clean wheel rims while the vehicle is in use. Thus, the vehicle owner must find the time to clean the rims or pay a cleaning service to do so. Therefore, a wheel rim cleaning device that can be removably secured to a wheel rim to clean the surface of the rim while the vehicle is in use is needed.

Devices have been disclosed in the known art that relate to wheel rim cleaners. These include devices that have been patented and published in patent application publications. These devices generally relate to handheld brushes that are operated by a user to clean the wheel rim. One device includes a hollow j-shaped tube with a brush head that is configured to apply a soap solution to the inside surface of a wheel rim. Another device includes a handheld brush that utilizes a motor to rotate a brush head to clean the crevices of the wheel rim. Another device includes a motorized brush and spray mechanism disposed within a drive through vehicle washing system to clean the wheel rim.

These known art devices have several drawbacks. Many of these devices require a user to hold a handle to apply the brush head to the wheel rim in order to effectively clean the rim. Many of these devices fail to include a fastener that secures the device to the hub of the wheel rim. Further, these devices do not include a housing having a bearing that is configured to rotate the wheel rim cleaner independent from the wheel, while a vehicle is in motion. Lastly, many of these devices fail to include a telescopically adjustable arm that allows the brush head to make contact with the interior surface of the wheel rim, such that the rim is cleaned while the vehicle is in motion.

In light of the devices disclosed in the known art, it is submitted that the present invention substantially diverges in design elements from the known art and consequently it is clear that there is a need in the art for an improvement to existing wheel rim cleaning devices. In this regard the instant invention substantially fulfills these needs.

SUMMARY OF THE INVENTION

In view of the foregoing disadvantages inherent in the known types of wheel rim cleaning devices now present in the known art, the present invention provides a new wheel rim cleaner wherein the same can be utilized for providing convenience for the user when automatically cleaning the surface of a wheel rim while a vehicle is in motion.

It is therefore an object of the present invention to provide a new and improved wheel rim cleaner that has all of the advantages of the known art and none of the disadvantages.

It is another object of the present invention to provide a wheel rim cleaner comprising a housing having a first side and a second side. The first side includes a first fastener disposed at a center thereof. An elongated arm extends radially from the first fastener, wherein the elongated arm includes a brush member on a distal end thereof. The elongated arm is telescopic such that the arm extends outwardly and retracts inwardly relative to the center of the first side. The second side includes a sidewall extending from a perimeter thereof, wherein the sidewall defines an open end. A bearing is disposed within the open end, wherein the bearing rotates the housing independently from a hub of the wheel rim. A second fastener is affixed to the bearing, wherein the second fastener secures the wheel rim cleaner to the hub of the wheel rim.

Another object of the present invention is to provide a wheel rim cleaner that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
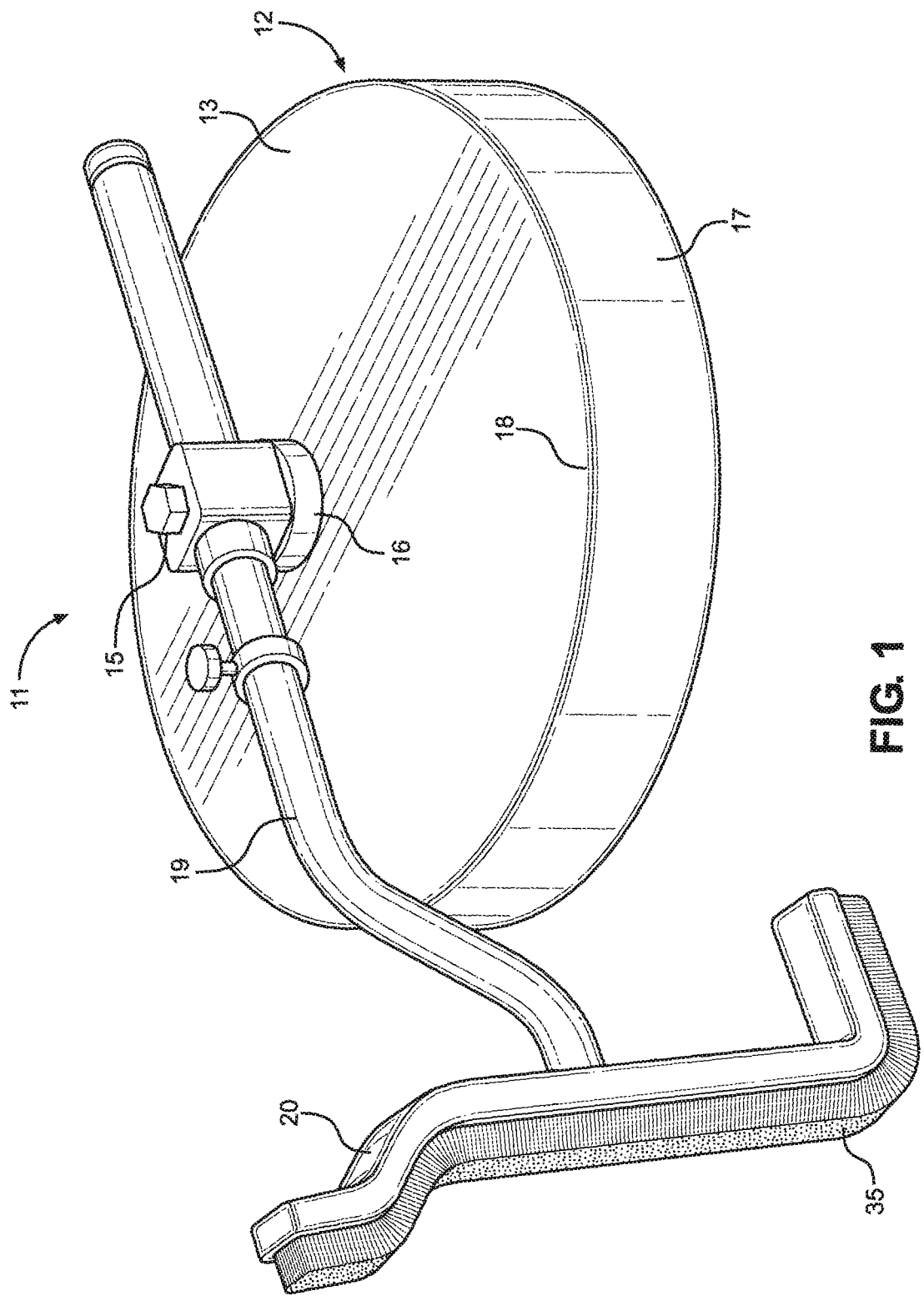
FIG. 1 shows a perspective view of an embodiment of the wheel rim cleaner.

Reference is made herein to the attached drawings. Like reference numerals are used throughout the drawings to depict like or similar elements of the wheel rim cleaner. For the purposes of presenting a brief and clear description of the present invention, the preferred embodiment will be discussed as used for cleaning the surface of a wheel rim while a vehicle is in motion. The figures are intended for representative purposes only and should not be considered to be limiting in any respect.

Figure 2:
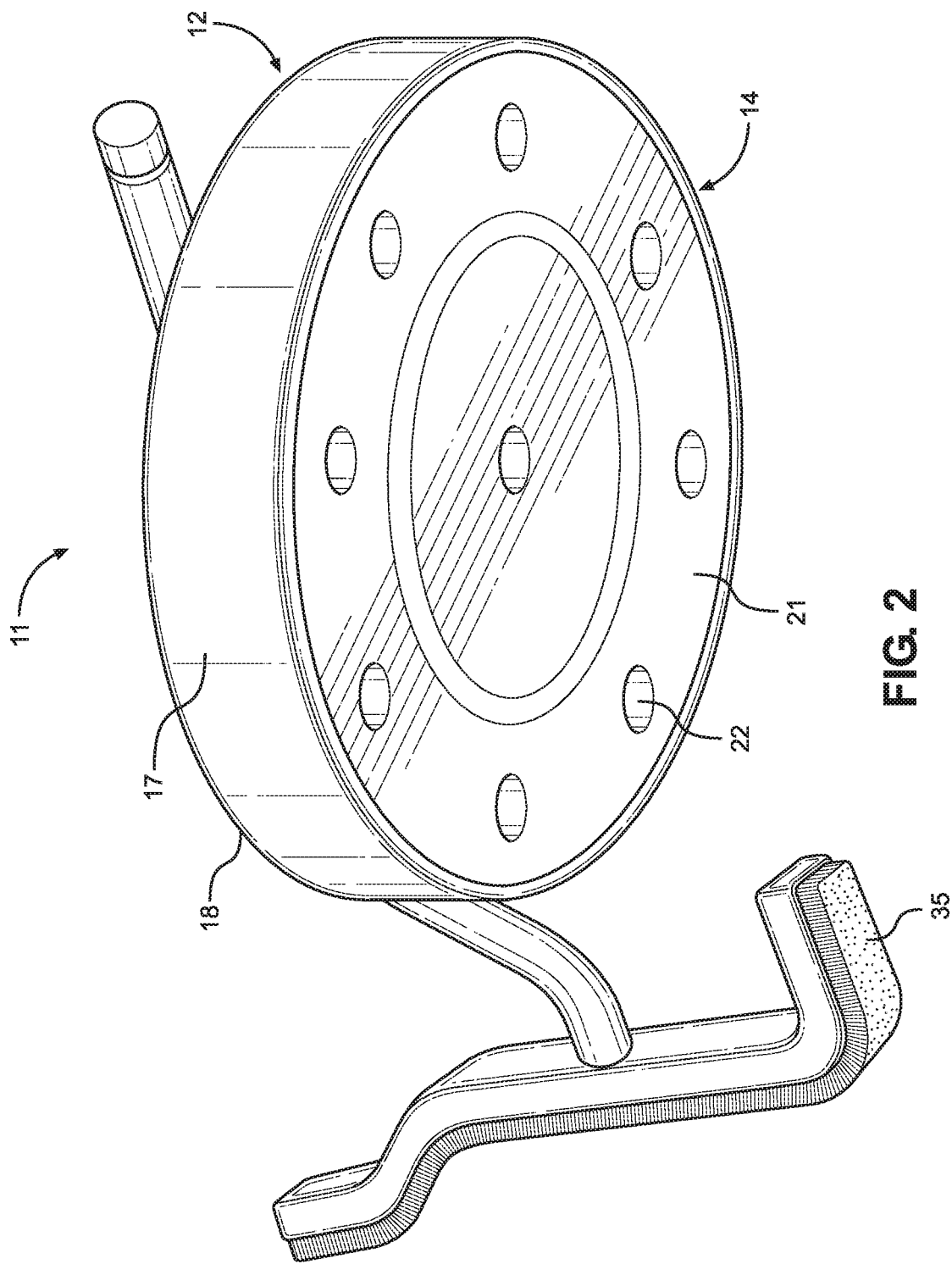
FIG. 2 shows a bottom view of an embodiment of the wheel rim cleaner.

Referring now to FIGS. 1 and 2, there is shown a perspective view of an embodiment of the wheel rim cleaner and a bottom view of an embodiment of the wheel rim cleaner, respectively. The wheel rim cleaner 11 comprises a housing 12 having a first side 13 and a second side 14. The housing 12 is constructed of a durable material, such as steel, configured to maintain the structure of the housing 12 when subjected to rotational force of a wheel rim in motion. However, any suitable durable material may be used. The first side 13 includes a first fastener 15 disposed at a center 16 thereof. An elongated arm 19 extends radially from the first fastener 15, wherein the elongated arm 19 includes a brush member 20 on a distal end thereof. In the illustrated embodiment, the brush member 20 includes a plurality of bristles 35 extending along the length thereof. Further, as shown, the brush member 20 is disposed perpendicularly in relation to the elongated arm 19. However, alternative brush member 20 configurations may be used.

The second side 14 includes a sidewall 17 extending from a perimeter 18 of the housing 12, such that the sidewall 17 defines an open end. A bearing 21 is disposed within the open end of the second side 14 of the housing 12, wherein the bearing 21 is configured to rotate the housing 12 independently from a hub of a wheel rim when attached thereto. The bearing 21 further includes a center aperture 23 configured to receive and secure the first fastener 15 of the first side 13, thereby securing the housing 12 thereto.

A second fastener 22 is disposed on the bearing 21, wherein the second fastener 22 is configured to secure the wheel rim cleaner 11 to the hub of the wheel rim. In the illustrated embodiment, the second fastener 22 is configured as a plurality of apertures disposed along a perimeter of the bearing 21, wherein the plurality of apertures removably secure the wheel rim cleaner 11 to the hub of the wheel rim via bolts. However, in alternative embodiments, any suitable fastener may be used.

Figure 3:
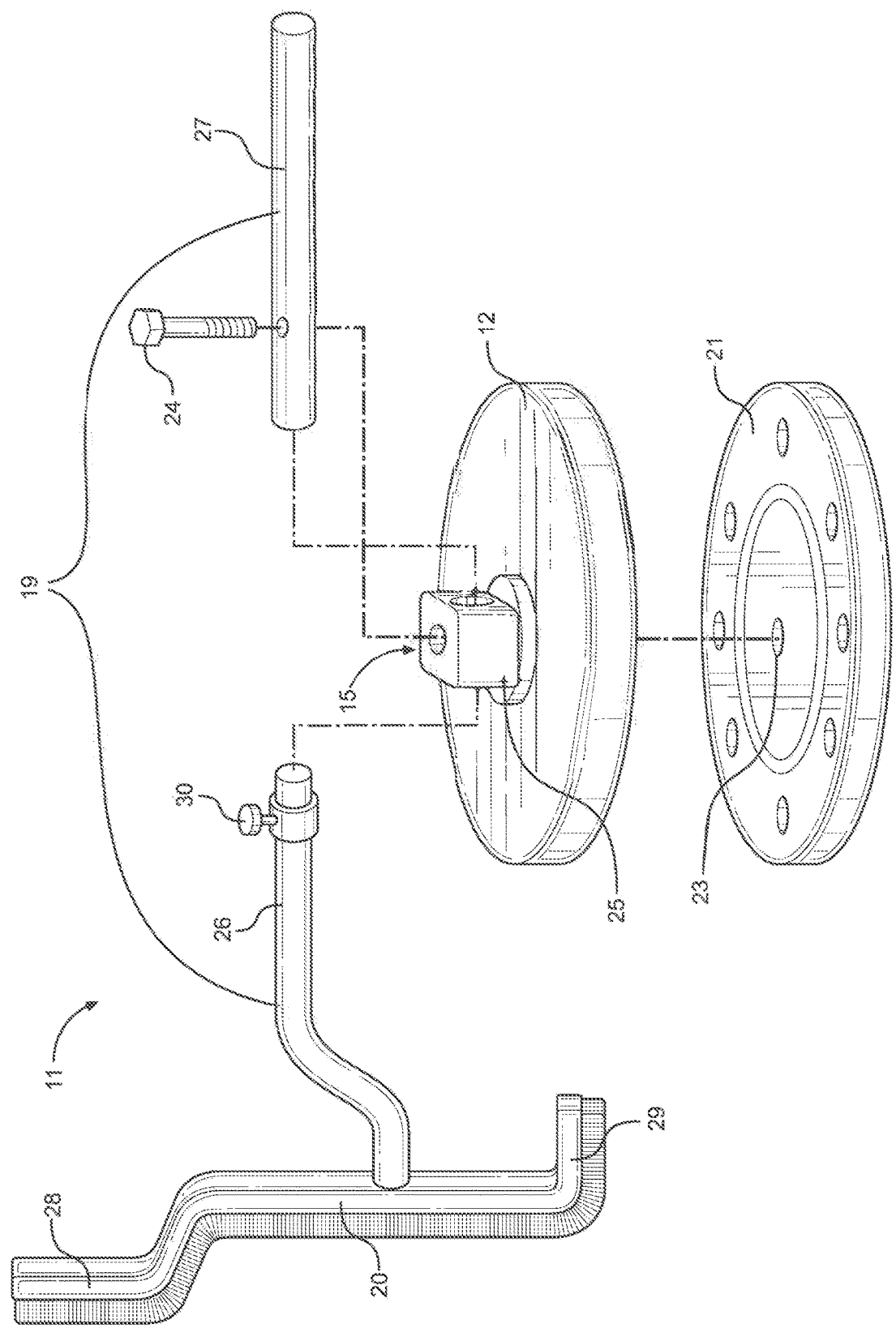
FIG. 3 shows an exploded view of an embodiment of the wheel rim cleaner.

Referring now to FIG. 3, there is shown an exploded view of an embodiment of the wheel rim cleaner. In the illustrated embodiment, the first fastener 15 comprises a bolt 24 and bracket member 25. The bolt 24 is received through an aperture at the center of the first side of the housing 12 and through the center aperture 23 of the bearing. In this way, the bolt 24 secures the housing 12 to the bearing 21, such that the bearing 21 can secure the wheel rim cleaner 11 to the hub of the wheel rim. The bracket member 25 further comprises an opening configured to receive and secure the elongated arm therein. However, alternative first fastener 15 configurations may be used.

In the illustrated embodiment, the elongated arm 19 further comprises a first arm member 26 and a second arm member 27 that are telescopically adjustable, such that the first arm member 26 can be extended outwardly and retracted inwardly from the second arm member 27 along a longitudinal axis thereof. This configuration allows the brush member 20 to be adjusted radially from the center of the housing to fit various wheel rim sizes, such that the plurality of bristles of the brush 20 rest flush with a surface of the wheel rim when attached. The elongated arm 19 includes a collar 30 that is configured to selectively secure the first arm member 26 within the second arm member 27, such that the first arm member 26 remains locked in place within the second arm member 27 while the wheel rim cleaner 11 is attached to the wheel rim.

In the illustrated embodiment, the brush member 20 includes an offset portion 28 and a right angled portion 29 at opposing ends of the brush member 20, such that the offset portion 28 and the right angled portion 29 are configured to substantially align with the surface of the wheel rim. The offset portion 28 comprises a longitudinal axis that is parallel in relation to the longitudinal axis of the brush member 20. The right angled portion 29 is disposed perpendicularly in relation of the longitudinal axis of the brush member 20. However, in alternative embodiments, any suitable configuration may be used to substantially align the brush member 20 with the surface of the wheel rim.

Figure 4:
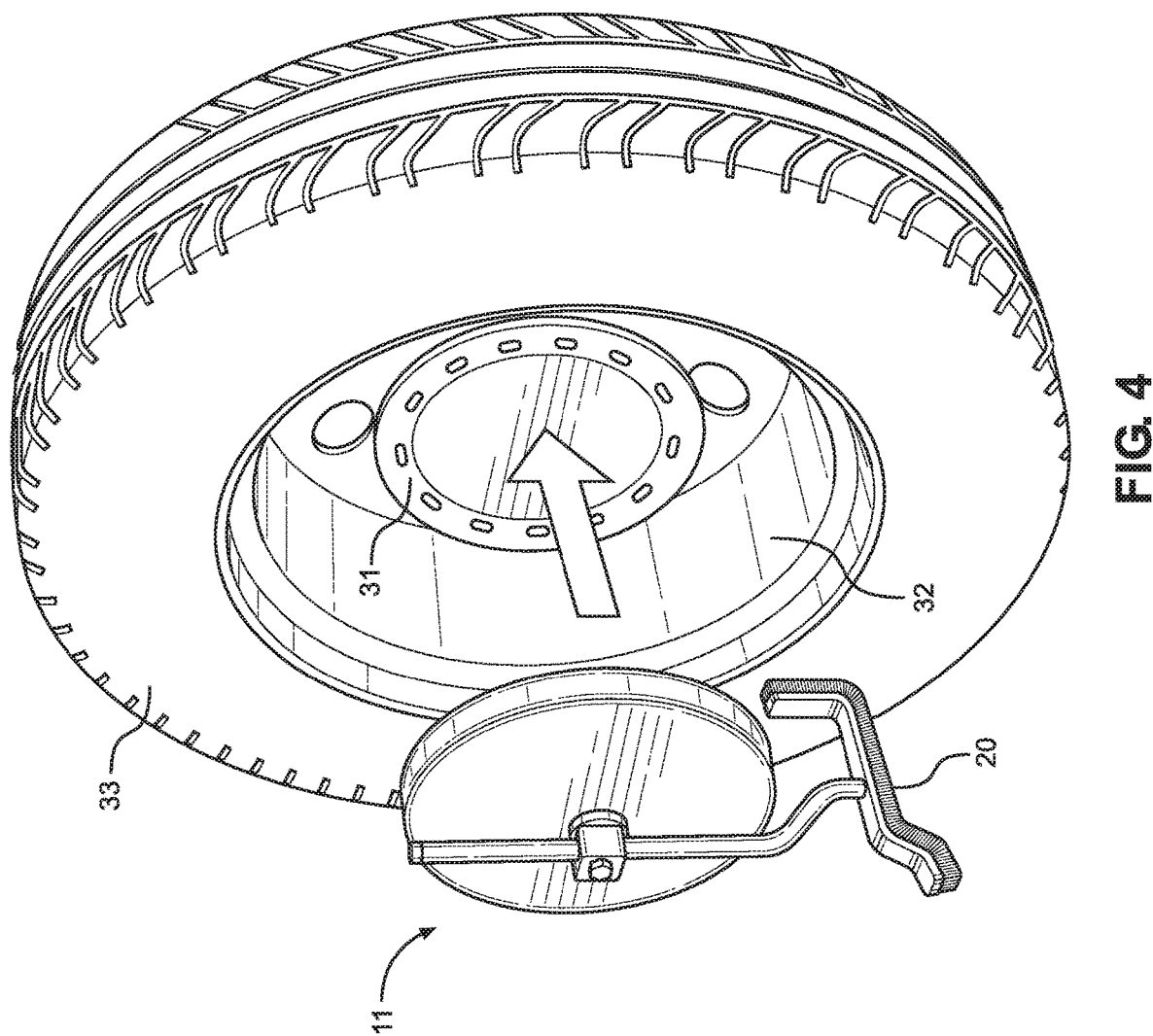
FIG. 4 shows a perspective view of an embodiment of the wheel rim cleaner, wherein a plurality of fasteners removably secure the housing to a wheel rim.
Figure 5:
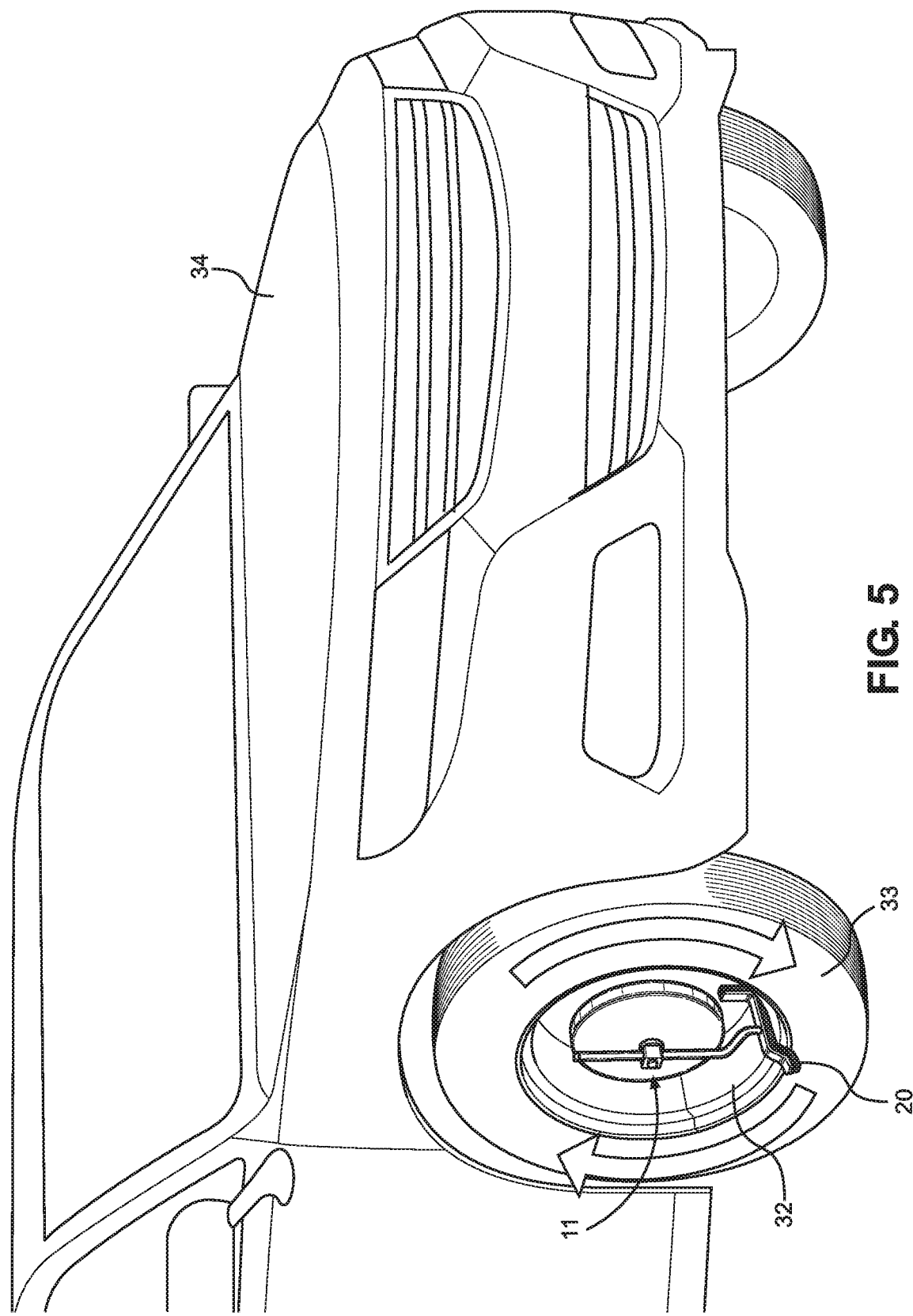
FIG. 5 shows a perspective view of an embodiment of the wheel rim cleaner secured to a wheel rim.

Referring now to FIGS. 4 and 5, there is shown a perspective view of an embodiment of the wheel rim cleaner, wherein a plurality of fasteners removably secure the housing to a wheel rim, and a perspective view of an embodiment of the wheel rim cleaner secured to a wheel rim, respectively. The wheel rim cleaner 11 is configured to removably secure to the hub 31 of the wheel rim 32. When secured, the bearing disposed within the housing allows the wheel rim cleaner 11 to rotate independently of the wheel rim 32 and tire 33.

In the illustrated embodiment, the brush member 20 of the wheel rim cleaner 11 is shaped like the inner surface of the exterior side of the wheel rim 32, such that the plurality of bristles make contact with all parts of the inner surface of the wheel rim 32 when the device 11 is mounted thereto. In this way, when the vehicle 34 is in motion thereby rotating the tire 33, the wheel rim 32 rotates about the arm of the wheel rim cleaner 11, making contact with the bristles of the brush member 20, wherein the bristles remove dirt and grim from the surface of the rim.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheel rim cleaner, comprising:
   a cylindrical housing having a first side and a second side, wherein the first side includes a first fastener disposed at a center thereof, and the second side includes a sidewall extending from a perimeter thereof, such that the sidewall defines an open end;
   an elongated arm extending radially from the first fastener, wherein the elongated arm includes a brush member on a distal end thereof;
   a bearing disposed within the open end of the second side of the cylindrical housing; and
   a second fastener disposed on the bearing.

2. The wheel rim cleaner of claim 1, wherein the brush member is perpendicular to the elongated arm.

3. The wheel rim cleaner of claim 2, wherein the brush member includes a plurality of bristles along a length thereof.

4. The wheel rim cleaner of claim 3, wherein the brush member includes an offset portion and a right angled portion disposed at opposing ends of the brush member, such that the offset portion and the right angled portion are configured to-align with a surface of the wheel rim.

5. The wheel rim cleaner of claim 1, wherein the second fastener comprises a plurality of apertures disposed along a perimeter of the bearing.

6. The wheel rim cleaner of claim 1, wherein the elongated arm comprises a first arm member and a second arm member that are telescopically adjustable, such that the first arm member can be extended outwardly and retracted inwardly from the second arm member along a longitudinal axis thereof.

7. The wheel rim cleaner of claim 1, wherein the cylindrical housing is constructed of a durable material.

8. The wheel rim cleaner of claim 7, wherein the durable material is steel.

9. A wheel rim cleaner, comprising:
- a cylindrical housing having a flat portion and a sidewall, wherein the sidewall extends down from a side of the flat portion;
- a bearing is located within the cylindrical housing, wherein the bearing is a cylindrical plate having holes disposed therethrough, configured to accept bolts from a car tire rim;
- a hole is located through the center of the cylindrical housing and the bearing, wherein the center holes are configured to align and accept a first connector therethrough;
- a second connector having a hole located therethrough is connected to the cylindrical housing and the bearing using the first connector;
- an elongated arm is disposed through the second connector such that the arm is parallel to the cylindrical housing;
- the elongated arm has a brush located at a first end, wherein the brush is configured to conform to the interior of a rim.

10. The wheel rim cleaner of claim 9, wherein the elongated arm comprises a first arm member and a second arm member that are telescopically adjustable, such that the first arm member can be extended outwardly and retracted inwardly from the second arm member along a longitudinal axis thereof.

11. The wheel rim cleaner of claim 9, wherein the brush member includes an offset portion and a right-angled portion disposed at opposing ends of the brush.

* * * * *